United States Patent
Hua et al.

(10) Patent No.: US 9,769,730 B1
(45) Date of Patent: Sep. 19, 2017

(54) SERVICE LEVEL AGREEMENT VIOLATION WARNING AND SERVICE SUSPENSION

(71) Applicant: Verizon Patent and Licensing Inc., Arlington, VA (US)

(72) Inventors: Suzann Hua, Walnut Creek, CA (US); Priscilla Lau, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/075,459

(22) Filed: Mar. 21, 2016

(51) Int. Cl.
*H04W 4/26* (2009.01)
*H04W 48/02* (2009.01)
*H04L 12/26* (2006.01)
*H04W 8/18* (2009.01)
*H04W 4/20* (2009.01)

(52) U.S. Cl.
CPC .............. *H04W 48/02* (2013.01); *H04L 43/16* (2013.01); *H04W 4/20* (2013.01); *H04W 8/18* (2013.01)

(58) Field of Classification Search
CPC ........... H04W 4/24; H04W 4/26; H04W 4/08; H04W 68/00; H04W 68/02; H04W 68/04; H04W 68/10; H04W 8/186; H04W 8/18; H04W 8/04; H04W 28/00; H04W 28/16; H04W 28/24; H04W 4/12; H04W 4/16; H04W 28/18; H04W 28/20; H04W 28/22; H04W 88/18; H04W 48/00; H04W 28/21; H04W 4/14; H04W 4/02; H04W 72/0493; H04W 8/183; H04W 12/00; H04W 12/08
See application file for complete search history.

(56) References Cited

U.S. PATENT DOCUMENTS

| | | | | |
|---|---|---|---|---|
| 7,574,502 B2 * | 8/2009 | Clymer | ............... | H04L 41/5016 709/224 |
| 7,783,666 B1 * | 8/2010 | Zhuge | ............... | G06F 17/30082 707/783 |
| 2006/0206619 A1 * | 9/2006 | Dan | .................... | G06F 21/6218 709/233 |
| 2007/0067428 A1 * | 3/2007 | Ogawa | ............... | H04L 12/5695 709/223 |

(Continued)

*Primary Examiner* — Meless Zewdu (57) ABSTRACT

A method including receiving a service request from a mobile station for a service to be provided by a mobile wireless communication network, wherein the mobile station is subscribed to the mobile wireless communication network under an account; obtaining, based on an identifier for the mobile station, a constraint describing a limitation on use of the service; determining that the first service request violates the constraint; obtaining, based on the identifier for the mobile station, a first threshold number of violations; determining, in response to the determination that the first service request violates the constraint, that a first total number of service requests violating the constraint issued by the mobile device or issued by mobile devices subscribed to the mobile wireless communication network under the account is equal to or greater than the first threshold number, wherein the first total number of service requests includes the first service request; identifying a notification destination for the account; and automatically transmitting, in response to the determination that the first total number is equal to or greater than the first threshold number, a first notification to the notification destination.

20 Claims, 6 Drawing Sheets

(56) References Cited

U.S. PATENT DOCUMENTS

| | | | |
|---|---|---|---|
| 2007/0099609 A1* | 5/2007 | Cai | H04L 41/5054 455/428 |
| 2007/0204033 A1* | 8/2007 | Bookbinder | G06Q 10/10 709/224 |
| 2012/0028603 A1* | 2/2012 | Gorman | H04L 12/14 455/408 |
| 2012/0295582 A1* | 11/2012 | Olofsson | H04M 15/745 455/406 |
| 2013/0171959 A1* | 7/2013 | Ahluwalia | H04W 36/0022 455/405 |
| 2013/0246105 A1* | 9/2013 | Winkler | G06Q 10/067 705/7.11 |
| 2016/0308734 A1* | 10/2016 | Feller | H04L 41/5009 |

* cited by examiner

FIG. 6 ns a single mobile station or a group of mobile stations. Without detail such as...

SERVICE LEVEL AGREEMENT VIOLATION WARNING AND SERVICE SUSPENSION

BACKGROUND

It is increasingly common for hardware devices other than mobile telephones to include transceivers configured for data communication via mobile wireless communication networks, such as cellular data networks. For example, a hardware manufacturer may wish to utilize such transceivers for telemetry or obtaining location information. To support low cost and efficient network connection and communication for such hardware devices, network operators usually offer SLAs (Service Level Agreements) of varying capability and capacity. Typically, such SLAs may impose particular limitations on the use of services provided by a mobile wireless communication network. Examples of such limitations include, but are not limited to, a maximum number of times a service may be used each day, a minimum period between subsequent uses of a service, time periods when usage is prohibited (for example, during typically high use daytime hours), or a maximum total amount of data that may be transferred per day.

In many cases, such hardware devices perform automated M2M (machine to machine) communication according to software executing on the hardware devices. Occasionally, such software is incorrectly written or encounters unanticipated events or errors, resulting in misuse or abuse of a service that is a SLAV (Service Level Agreement Violations)—use of the service (or requested use of the service) that exceeds the limitations on use of the service imposed by the SLA. In response to such violations, a wireless mobile communication network may simply deny service to misbehaving hardware devices, which may frustrate a manufacturer's attempts to address the causes of the misbehavior.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
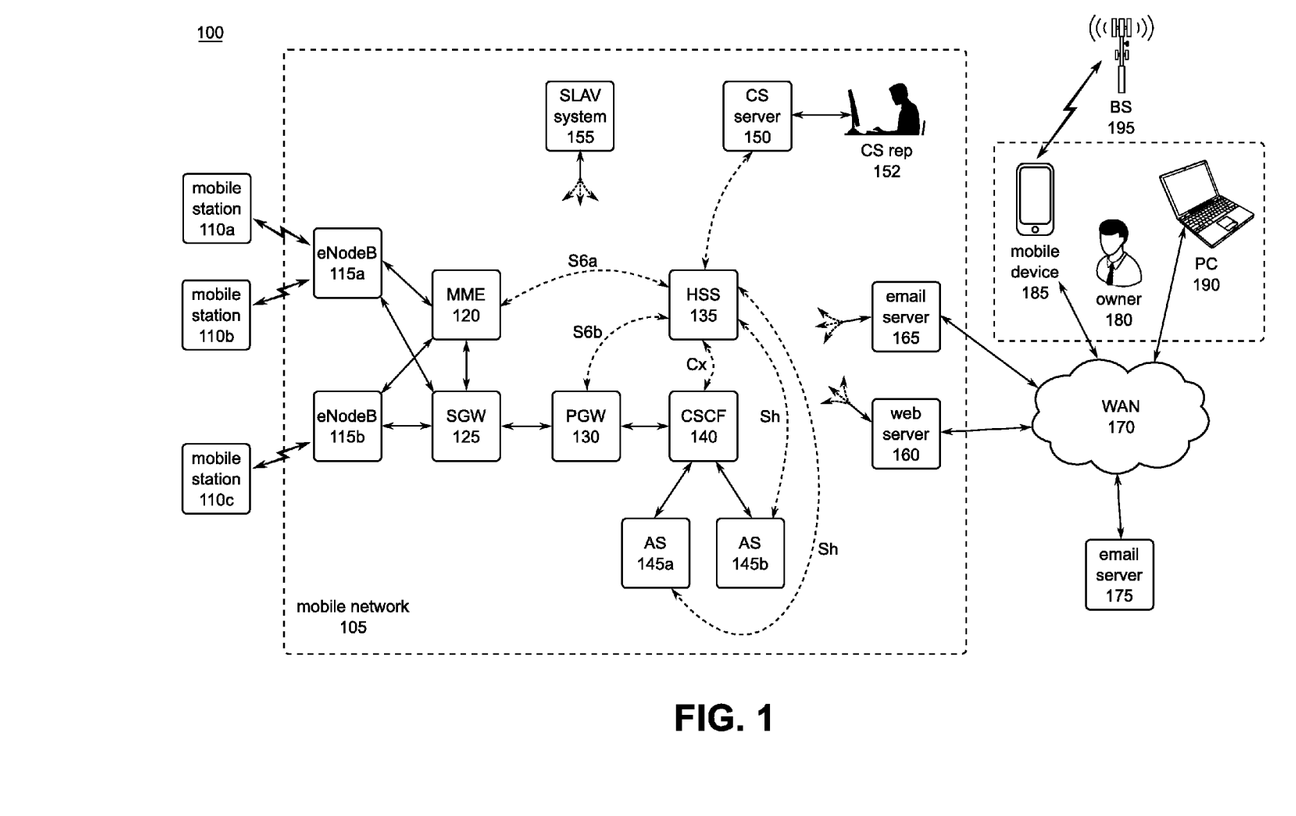
FIG. 1 illustrates an example of a system for responding to and addressing service level agreement violations.

FIG. 1 illustrates an example of a system 100 for responding to and addressing service level agreement violations. It is noted that FIG. 1 provides a simplified view of mobile wireless communication network 105, in which certain elements or redundant elements have been omitted for the convenience of discussion. Mobile stations 110a, 110b, and 110c each include transceiver hardware that allow mobile stations 110a, 100b, and 110c to make use of one or more services provided by mobile wireless communication network 105. Mobile stations 110a may also be referred to as "user equipment." In the illustrated example, mobile stations 110a, 110b, and 110c are all subscribed to mobile wireless communication network 105 under the same account, which is associated with account owner 180. For example, account owner 180 might be a manufacturer, vendor, or service provider that put mobile stations 110a, 110b, and 110c into service and wishes to remotely monitor usage, status, or location of mobile stations 110a, 110b, and 110c, even though mobile stations 110a, 110b, and 110c may be used by end users different than account owner 180. Although all of the mobile stations illustrated in FIG. 1 are subscribed under a single account, in other examples the mobile stations may be subscribed under separate accounts. Also, although a single account owner 180 is illustrated in FIG. 1, it is contemplated that there would be a plurality of account owners, each associated with one or more mobile stations.

The account under which mobile stations 110a, 110b, and 110c are subscribed to mobile wireless communication network 105 operates under a Service Level Agreement (SLA) that defines constraints on the use of services provided by mobile wireless communication network 105 by mobile stations 110a, 110b, and 110c. A mobile station may be granted access to one or more services under an SLA, and for each service available under the SLA there may be one or more constraints each describing a limitation on use of the service under the SLA. Examples of services that might be provided by mobile wireless communication network 105 include, but are not limited to, network access/attachment, SMS messaging, outgoing data access (data sent by a mobile station), incoming data access (data received by a mobile station), bidirectional data access (data sent and received by a mobile station), network application usage, and location information (obtaining a geographic location for a mobile station based on signals exchanged between the mobile station and mobile wireless communication network 105).

A constraint may describe a limitation on an individual mobile station's use of a service. For example, each mobile station subscribed under an account may be limited to no more than two outgoing SMS messages per day (with a "day" perhaps being defined as, for example, a 24 hour period beginning at midnight). A constraint may describe a limitation on use of a service by all of the mobile stations subscribed under an account. For example, all of the mobile stations subscribed under an account may be limited to transferring, in the aggregate, no more than 100 megabytes of data per day. Under such a constraint, 80 megabytes of data transfer by mobile station 110a, 15 megabytes of data transfer by mobile station 110b, and 3 megabytes of data transfer by mobile station 110c would not violate the constraint, despite the significant difference in usage by the three mobile stations 110a, 110b, and 110c. Example of constraints under an SLA include, but are not limited to: a maximum number of times a service may be requested within a duration of time (for example, each hour, day, week, or month), a maximum amount of data to be transferred within a duration of time (for example, transmission of no more than 50 kilobytes of data per day by a mobile station), network access only during certain times/durations (for example, not during daytime hours when a network is typically busier), a minimum amount of time between subsequent service requests (for example, after a first use of a service, there must be a minimum of one hour before the service may be used again by the mobile station), and certain geographic locations for service (such as particular service areas defined by, for example, eNodeBs, MMEs (Mobility Management Entities), tracking areas, etc.). A service request received from a mobile station that violates a constraint under an SLA may be referred to as a Service Level Agreement Violation (SLAV).

Due to limited use of mobile wireless communication network 105 and/or to reduce power consumption, mobile stations 110a, 110b, and 110c may be configured to attach to mobile wireless communication network 105 intermittently as needed, rather than be continuously attached to mobile wireless communication network 105. In the example illustrated in FIG. 1, when mobile stations 110a, 110b, and 110c do attach to mobile wireless communication network 105, they attach via eNodeBs, such as eNodeBs 115a and 115b. Other mobile wireless communication network architectures may be used. Which eNodeB a mobile station attaches to generally is a result of the locations of the eNodeBs relative to the mobile station and network conditions at the time of attachment. In FIG. 1, mobile stations 110a and 110b have attached via eNodeB 115a, and mobile station 110c has attached via eNodeB 115b. eNodeBs 115a and 115b function as wireless access points that perform wireless (typically RF-based) communication between mobile stations and mobile wireless communication network 105.

MME (Mobility Management Entity) 120 is responsible for control plane functions related to subscriber and session management. Among other things, MME 120 performs authentication and authorization of requests by mobile stations 110a, 110b, and 110c to attach to mobile wireless communication network 105 via eNodeBs 115a and 115b. Additionally, MME 120 is responsible for selecting SGW (Sending Gateway) 125 and PGW (Packet Data Network Gateway) 130. MME 120 is linked through an S6a Diameter interface to HSS (Home Subscriber Server) 135, which maintains one or more databases of subscriber and account information, including SLA information. MME 120 may obtain SLA information from HSS 135 via the S6a Diameter interface. SGW 125 performs, among other things, forwarding of packets between eNodeBs 115a and 115b and PGW 130. PGW 130 performs, among other things, forwarding of packets between SGW 125 and CSCF (Call Session Control Function) 140. PGW 130 is linked through an S6b Diameter interface to HSS 135. PGW 130 may obtain SLA information from HSS 135 via the S6b Diameter interface. CSCF 140, among other things, provides and controls access to AS (Application Server) 145a and AS 145b. For example, CSCF 140 may determine to which AS a service request should be directed based on the contents of the service request, such as which service is being requested. CSCF 140 is linked through a Cx Diameter interface to HSS 135. CSCF 140 may obtain SLA information from HSS 135 via the Cx Diameter interface. In some examples, packets exchanged between mobile stations 110a, 110b, and 110c and CSCF 140 may be encrypted, which may render MME 120 and PGW 130 as service unaware, at least for some services available via mobile wireless communication network 105. AS 145a and AS 145b each provide services for use by mobile stations 110a, 110b, and 110c. AS 145a and AS 145b may both provide the same service, for availability and/or capacity, or they may provide different services. AS 145a and AS 145b are each linked through a Sh Diameter interface to HSS 135. AS 145a and AS 145b may obtain SLA information from HSS 135 via the Sh Diameter interface.

SLAV (Service Level Agreement Violation) system 155 is an optional element of mobile wireless communication network 105, and may be configured to perform some of the features discussed in this disclosure. For example, SLAV system 155 may receive notifications from other elements of mobile wireless communication network 105 when such elements detect occurrences of SLA constraint violations. SLAV system 155 may, in response to such notifications, be configured to determine when warning and suspension thresholds have been met or exceeded, and in response may be configured to issue notifications and/or request suspension of a mobile station or the account under which it is subscribed. SLAV system 155 may be implemented as a separate component of mobile network 105 (such that modifications to other elements of mobile wireless communication network 105 may be reduced) and/or may be implemented within one or more of MME 120, SGW 125, PGW 130, HSS 135, CSCF 140 AS 145a, and AS 145b.

Email server 165 is provided to allow sending notifications to account owners via email. For example, if account owner 180 has an email-based notification destination (which may be recorded in HSS 135 along with other account information, for example), in the event that a warning or suspension notification is to be sent, the sending element of mobile wireless communication network 105 may utilize email server 165 to send an email notification. The email notification is then sent via WAN (wide-area network, one example of which is the Internet) 170 to email server 175 associated with an email account for receiving email notifications for account owner 180. Account owner 180 may be notified of and access the email notification via appropriate software executed on mobile device 185 (such as, but not limited to, a smartphone) and/or PC (personal computer) 190. Text message notifications may be delivered to account owner 180 via base station (BS) 195, which may or may not be included in operator of mobile wireless communication network 105.

After a service suspension due to SLAVs, it is expected that account owner 180 will contact an operator of mobile wireless communication network 105 to resolve the suspension. For example, account owner 180 may contact customer service representative (CS rep) 152 to discuss the suspension. Customer service representative 152 may interact, typically via a computer workstation, with CS server 150 to investigate the service suspension. CS server 150 is configured to communicate with HSS 135 to obtain, and in some cases modify, account information for account owner 180. CS server 150 may also be configured to obtain, from HSS 135 or other elements included in mobile wireless communication network 105 (for example, from logs recorded and stored by SLAV system 155), specific details regarding SLAVs that led to the service suspension. CS server 150 may also send a request to HSS 135 to remove the service suspension in response to account owner 180 having contacted the operator of mobile wireless communication network 105.

Web server 160 may be configured to provide an interface for account owner 180, via a web browser application or other application running on mobile device 185 or PC 190, to interact with customer service representative 152 or CS server 150. Additionally, web server 160 may be configured to provide account owner 180 with access to specific details regarding SLAVs that led to a service suspension, which may be obtained from HSS 135 or other elements included in mobile wireless communication network 105. Web server 160 may also be configured to provide details of other mobile station activity. Such details can facilitate account owner 180's attempts at resolving problems with mobile stations 110a, 110b, and 110c that resulted in SLAVs.

Figure 2:
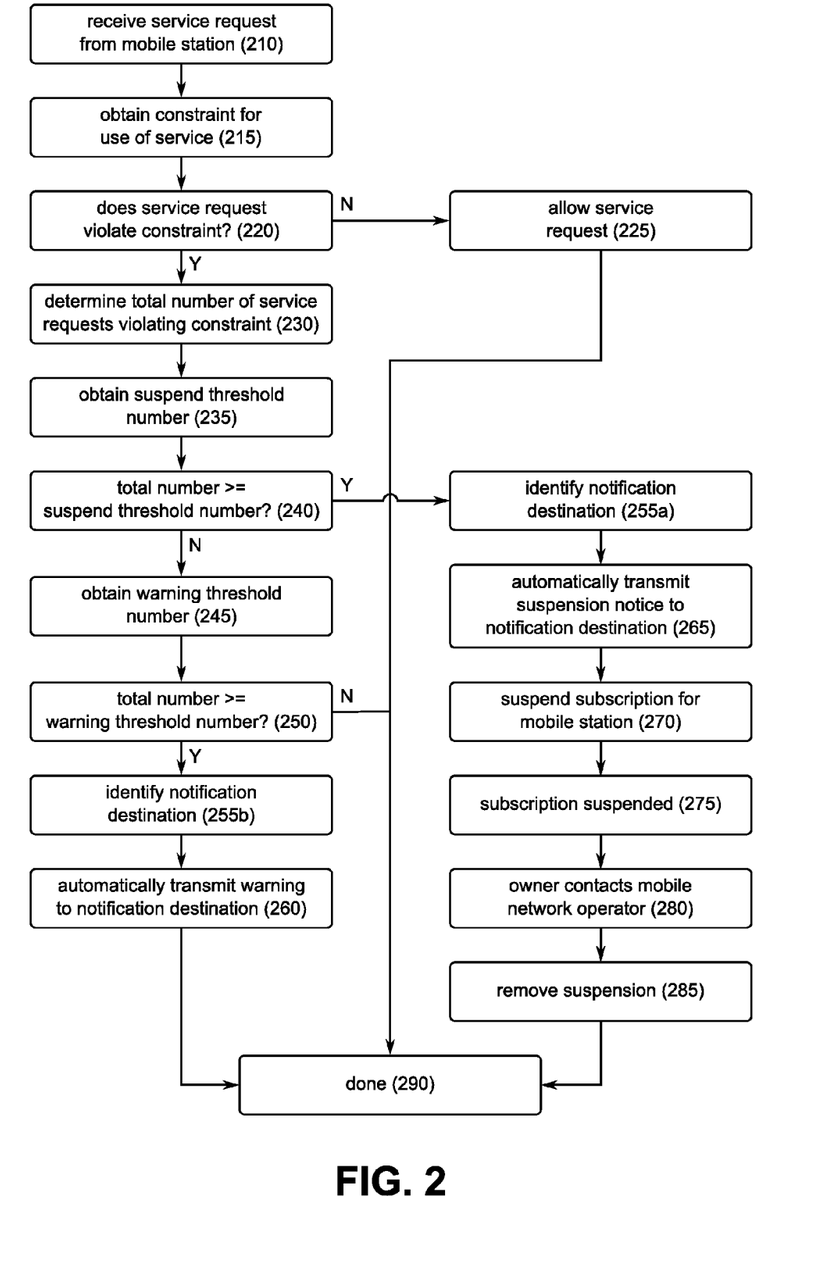
FIG. 2 illustrates an example process for identifying and responding to Service Level Agreement Violations (SLAVs).

FIG. 2 illustrates an example process for identifying and responding to Service Level Agreement Violations (SLAVs). It is noted that the features illustrated in FIG. 2 do not necessarily have to be performed in the order illustrated in FIG. 2. At 210, a network element included in mobile wireless communication network 105 receives a service request from mobile station 110a for a service to be provided by mobile wireless communication network 105. For example, MME 120, PGW 130, CSCF 140, AS 145a, or AS 145b may receive the service request.

At 215, the network element that received the service request at 210 obtains a constraint describing a limitation of use of the requested service. This constraint be obtained based on an identifier obtained for mobile station 110a, which may be, for example, a unique identifier for mobile station 110a or an account identifier identifying an account under which mobile station 110a is subscribed to mobile wireless communication network 105. The network element may obtain the constraint from HSS 135 via, for example, a Diameter interface between the network element and HSS 135. For example, SLA information, including the constraint, may be included in a service profile for mobile station 110a, and MME 120, or another element of mobile wireless communication network 105, may perform a service profile request to obtain the service profile, and thereby also obtain the SLA information and the constraint included therein. MME 120 may be configured to, for example, download the service profile, or perform one or more queries for portions of the service profile, each time mobile station 110a registers with mobile wireless communication network 105. For example, SLA constraint information included in a downloaded service profile might indicate that a mobile device operating under the SLA is limited to two attaches to the network each day, is limited to transmitting less than 50 kilobytes of data via the network per day, and/or a geographic region or a list of eNodeBs that operation of a mobile station is limited to. The network element may obtain the constraint from another element included in mobile wireless communication network 105. In some examples, there may be more than one constraint; for example, a first constraint may relate to a frequency of service requests, and a second constraint may relate to an aggregate amount of data for service requests.

Certain elements of mobile wireless network 105 may be preferred for detecting violations of certain constraints. For example, MME 120 might be used to enforce constraints relating to network access only during certain times/durations or geographic limitations; PGW 130 might be used to enforce constraints relating to amounts of data transferred within a duration of time; CSCF 140 might be used to enforce constraints relating to a maximum number of times a service may be requested within a duration of time or a minimum amount of time between subsequent service requests; and AS 145a or AS 145b might be used enforcing constraints for services controlled by the ASes, such as application dependent service requests. It is noted that these are merely examples of how such network elements may be involved in handling SLAVs.

At 220, the network element determines whether the service request received at 210 violates the constraint obtained at 215, and as a result, that a SLAV has occurred. In some examples, the network element may obtain additional information relating to previous service requests received by mobile wireless communication network 105 from mobile station 110a or other mobile stations also subscribed under the account that mobile station 110a is subscribed under (such as mobile stations 110b and 110c in the example illustrated in FIG. 1). For example, if the constraint indicates successive service requests by a mobile station may be no closer than 30 minutes apart, the network element may obtain at least the time for the most recent service request from mobile station 110a to determine whether it was less than 30 minutes prior to the service request received at 210. The additional information may be stored by the network element or obtained from another element of mobile wireless communication network 105. As another example, to enforce a constraint relating to a maximum amount of data that may be transferred within a duration of time, PGW 130 may be configured to send and receive bandwidth usage data to/from a usage control server (not illustrated), which may be, for example, implemented as an Application Server. The usage control server may be configured to, for example, receive per-session bandwidth usage data from PGW 130 an determine a total bandwidth usage amount for one or more sessions over a period of time, or make session data later available to PGW 130 for PGW 130 to determine such total amounts. In some examples, the usage control server, rather than PGW 130, may be configured to determine when SLAVs occur with respect to a maximum amount of data that may be transferred within a duration of time. In such examples, the usage control server may download service profile information for mobile station 100a from HSS 135 via an Sh Diameter interface.

If at 220 a violation is not detected ('N'), the process proceeds to 225 and the service request is allowed to proceed. In some examples, the service request may completed by the network element that received the service request at 210. In some examples, the service request may be completed by a different element; for example, if CSCF 140 is the network element that allows the service request at 225, AS 145a may be the element that actually performs the service request (such as, for example, transmitting data via the Internet to a remote server). It is also noted that although a first network element, such as MME 120, may allow a service request to proceed, a second element, such as CSCF 140, may determine the same service request violates an SLA constraint. From 225, the process proceeds to 290, where it completes (at least with respect to the network element that received the request at 210).

If at 220 a violation is detected ('Y'), the process proceeds to 230. The network element may refuse the service request in response to determining the SLAV has occurred. In some examples, the network element may transmit a message to another element of mobile wireless communication network 105 that the SLAV has occurred. This may result in the element that receives the message performing some of the remaining portions of the process in FIG. 2, such as 230-265.

At 230, a total number of service requests that have violated the constraint is determined. A number of previous service requests that have violated the constraint may be obtained; for example, from HSS 135 or another element included in mobile wireless communication network 105. If the constraint describes a limitation on an individual mobile station's use of a service, the number indicates a number of previous service requests that have violated the constraint that were issued by the single mobile station 110a. If the constraint describes a limitation on use of a service by all of the mobile stations subscribed under an account, the number indicates a total number of previous service requests that have violated the constraint that were issued by all of the mobile stations subscribed under the account (mobile stations 110a, 110b, and 110c in the example illustrated in FIG. 1). The obtained number may be incremented by one to yield a total number of service requests that have violated the constraint, including the service request received at 210. The incremented number may be stored in an element of mobile wireless communication network 105, such as the element from which the number of previous service requests that have violated the constraint was obtained.

At 235, a suspend threshold number is obtained. The suspend threshold number indicates the number of SLAVs that will trigger mobile wireless communication network 105 to suspend service for mobile station 110a or all of the devices subscribed under the account under which mobile station 110a is subscribed. At 240, a determination is made whether the total number determined at 230 is greater than or equal to the suspend threshold number obtained at 235. In some examples, this simply involves determining whether the two numbers are equal. If the determination is negative ('N', the suspend threshold has not been reached), the process continues to 245. In some examples, if the determination is negative ('N'), the process may continue to 290, where the process completes. If the determination is positive ('Y', the suspend threshold has been reached), the process continues to 255a.

At 255a, a notification destination is identified for the account that mobile device 110a is subscribed under. The notification destination may be, for example, an email address or an SMS text message number. The notification destination may be recorded with other account information in HSS 135, and obtained via, for example, a Diameter interface. In some examples, the notification destination may be stored in and obtained from another element of mobile wireless communication network 105. In some examples, the notification destination may be a voice telephone contact number, to which an automated call may be placed or to which a customer service representative may be directed to place a call. At 265, a suspension notice is automatically transmitted to the notification destination identified at 255a. The type of notification destination may affect the form of the notice and how it is delivered to account owner 180. For example, if the notification destination is an email address, the suspension notice may be transmitted as an email via email server 165 to be received by email server 175 associated with the email address. As another example, if the notification is an SMS text message number, mobile wireless communication network 105 may transmit the suspension notice via SMS, which may be delivered to mobile device 185 associated with the SMS text message number. There are various other forms and delivery mechanisms for the suspension notice, including, but not limited to, voice telephone contact and an alert sent to an application executing on a smartphone device, such as mobile device 185 illustrated in FIG. 1. In some examples, multiple notification destinations may be identified at 255a, and each utilized at 265. The notification may include information for contacting the operator of the mobile wireless communication network 105, such as, but not limited to, a telephone number or a URL for a web browser.

At 270, a request to suspend a subscription for mobile station 110a is issued. For example, an element of mobile wireless communication network 105, such as MME 120, PGW 130, CSCF 140, AS 145a, AS 145b, or SLAV system 155, may send, via a Diameter interface with HSS 135, and AVP (attribute/value pair) that requests HSS 135 set the mobile station 110a inactive due to an SLAV. For example, a Diameter AVP "Set UE inactive for SLAV" may be supported across the S6a, S6b, Cx, and Sh interface protocols illustrated in FIG. 1. For the S6a interface between MME 120 and HSS 135, the AVP "Set UE inactive for SLAV" may be added to a Purge-UE-Request message sent from MME 120 to HSS 135. For the S6b interface between PGW 130 and HSS 135, the AVP "Set UE inactive for SLAV" may be added to a Session-Termination-Request message sent from PGW 130 to HSS 135. For the Cx interface between CSCF 140 and HSS 135, the AVP "Set UE inactive for SLAV" may be added to a Server-Assignment-Request message with an indication of administrative deregulation sent from CSCF 140 to HSS 135. For the Sh interface between AS 145a or AS 145b and HSS 135, the AVP "Set UE inactive for SLAV" may be added to a Profile-Update-Request message sent from AS 145a or AS 145b to HSS 135.

In an event that the violated constraint describes a limitation on use of a service by all of the mobile stations subscribed under an account, the request may request that subscriptions for all mobile stations subscribed under the account be suspended. At 275, the subscription or subscriptions indicated by the request at 270 are suspended. For example, HSS 135 may store or modify a value in a database indicating that the subscription for mobile station 115a is suspended due to an SLAV. After the suspension has been recorded, mobile station 110a will be unable to make use of mobile wireless communication network 105. For example, attempts by MME 120 to attach mobile station 110a to mobile wireless communication network 105 may be rejected.

At 280, the account owner 180 contacts the operator of mobile wireless communication network 105. As discussed previously, account owner 180 might contact customer service representative 152 by telephone, or contact the operator via web server 160. In response to an acceptable resolution of the suspension between the operator and the account owner 180, the process may process to 285, where the suspension applied at 275 is removed. For example, customer service server 150 may transmit a request to HSS 135 for the suspension applied at 275 to be removed, thereby allowing mobile station 110a to resume ordinary use of mobile wireless communication network 105. After 285, the process proceeds to 290, where it concludes.

At 245, a warning threshold number is obtained. The warning threshold number is less than the suspend threshold number. The warning threshold number indicates the number of SLAVs that will trigger mobile wireless communication network 105 to send a warning notification to account owner 180. At 250, a determination is made whether the total number determined at 230 is greater than or equal to the warning threshold number obtained at 245. In some examples, this simply involves determining whether the two numbers are equal. If the determination is negative ('N', the warning threshold has not been reached), the process continues to 290, where the process completes. If the determination is positive ('Y', the warning threshold has been reached), the process continues to 255b. At 255b, a notification destination is identified in the same manner as described for 255a. At 260, a warning notice is automatically transmitted to the notification destination identified at 255b, in much the same manner as described for 265 above. After 260, the process proceeds to 290 to complete.

In some examples, only one warning will be transmitted to the notification destination prior a suspension notice being transmitted to the notification destination. For example, if the warning threshold is 2 and the suspend threshold 5, SLAV #1 would not result in a notification, SLAV #2 would result in a warning, SLAVs #3 and #4 would not result in notifications, and SLAV #5 would result in a suspension notice (and suspension of service). In some examples, each SLAV at or above the warning threshold number, but less than the suspend threshold number, would have an accompanying warning. For example, if the warning threshold is 2 and the suspend threshold 5, SLAV #1 would not result in a notification, SLAVs #2, #3, and #4 would result in three respective warnings, and SLAV #5 would result in a suspension notice (and suspension of service).

Figure 3:
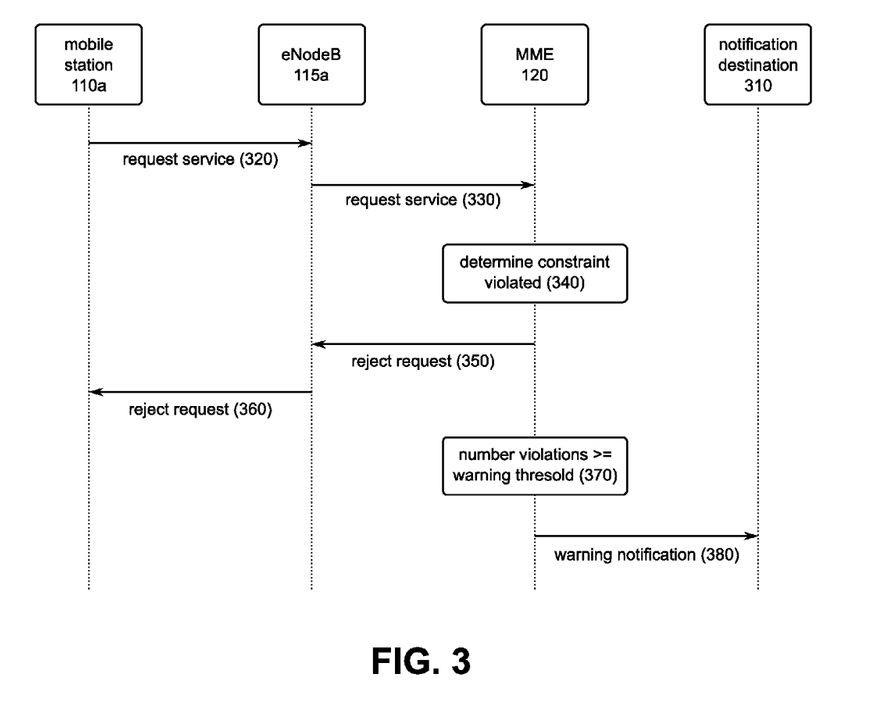
FIG. 3 illustrates a specific example in which a warning notification is issued in response to an SLAV.

FIG. 3 illustrates a specific example in which a warning notification is issued in response to an SLAV. Although not illustrated in FIG. 3, prior to 320, mobile station 110a attaches to mobile wireless communication network 105 via eNodeB 115a, much as discussed below with respect to 405 in FIG. 4. At 320, mobile station 110a requests use of a service provided by mobile wireless communication network 105 via eNodeB 115a to which it is attached. At 330, the service request at 320 is forwarded via eNodeB 115a to MME 120. MME 120 performs the procedures described with respect to 210, 215, and 220 in FIG. 2, and as a result, at 340 determines that the service request received by MME 120 at 330 violates a constraint describing a limitation of use of the service by mobile station 110a (or mobile stations subscribed under the same account as mobile station 110a, for an account-level constraint). It is noted that although MME 120 is illustrated as determining the constraint was violated in FIG. 3, this detection may be performed by other network elements included in mobile wireless communication network 105, such as, but not limited to, PGW 130, CSCF, 140, AS 145a, and AS 145b. At 350, in response to the determination that the constraint was violated, MME 120 rejects the service request. At 360, the rejection at 350 is forwarded to mobile station 110a via eNodeB 115a. MME 120 performs the procedures described with respect to 230, 245, and 250 in FIG. 2, and as a result, at 370 determines that the total number of service requests that have violated the constraint is equal to or greater than the warning threshold obtained for mobile station 110a. As a result, at 380, MME 120 causes a warning notification to be transmitted to a notification destination 310 associated with account owner 180 for mobile station 110a, much as described with respect to 255b and 260 in FIG. 2. It is noted that in some examples, the procedures described with respect to 230, 245, and 250 in FIGS. 2 and 370 and 380 in FIG. 3 may be performed by one or more other elements included in mobile wireless communication network 105, such as, but not limited to, SLAV system 155. In such examples, MWE 120 would be configured to send a message to one of those other elements as a notification of the SLAV detected at 340.

Figure 4:
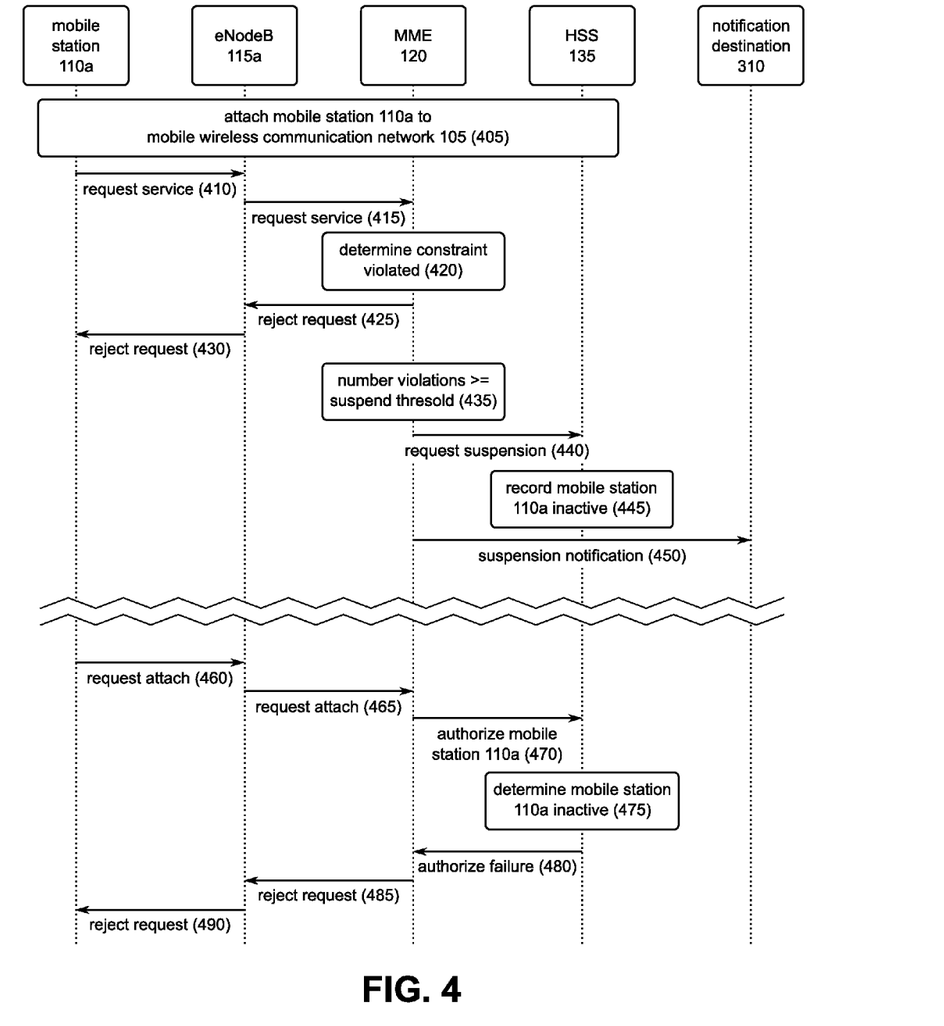
FIG. 4 illustrates a specific example in which a subscription for a mobile station to a mobile wireless communication network is suspended in response to an SLAV.

FIG. 4 illustrates a specific example in which a subscription for a mobile station to a mobile wireless communication network is suspended in response to an SLAV. At 405, mobile station 110a successfully attaches to mobile wireless communication network 105, via eNodeB 115a, including authentication and authorization of mobile station 110a by MME 120 and HSS 135. At 410, mobile station 110a requests use of a service provided by mobile wireless communication network 105 via eNodeB 115a to which it is attached. At 415, the service request at 410 is forwarded via eNodeB 115a to MME 120. MME 120 performs the procedures described with respect to 210, 215, and 220 in FIG. 2, and as a result, at 420 determines that the service request received by MME 120 at 415 violates a constraint describing a limitation of use of the service by mobile station 110a (or mobile stations subscribed under the same account as mobile station 110a, for an account-level constraint). It is noted that although MME 120 is illustrated as determining the constraint was violated in FIG. 4, this detection may be performed by other network elements included in mobile wireless communication network 105, such as, but not limited to, PGW 130, CSCF, 140, AS 145a, and AS 145b. At 425, in response to the determination that the constraint was violated, MME 120 rejects the service request. At 430, the rejection at 425 is forwarded to mobile station 110a via eNodeB 115a. MME 120 performs the procedures described with respect to 230, 235, and 240 in FIG. 2, and as a result, at 435 determines that the total number of service requests that have violated the constraint is equal to or greater than the suspend threshold obtained for mobile station 110a. As a result, at 440 MWE transmits a message to HSS 135 requesting that a subscription for mobile station 110a be suspended, much as discussed with respect to 270 in FIG. 2. At 445, HSS 135, in response to the message received at 440, records in a database that the subscription for mobile station 110a is inactive or suspended as a result of the SLAV detected at 420. At 450, in response to the SLAV detected at 420, MME 120 causes a suspension notification to be transmitted to a notification destination 310 associated with account owner 180 for mobile station 110a, much as described with respect to 255a and 265 in FIG. 2. It is noted that in some examples, the procedures described with respect to 230, 235, and 240 in FIGS. 2 and 435, 440, and 450 in FIG. 4 may be performed by one or more other elements included in mobile wireless communication network 105, such as, but not limited to, SLAV system 155. In such examples, MWE 120 would be configured to send a message to one of those other elements as a notification of the SLAV detected at 420.

Sometime later, at 460 mobile station 110a again attempts to attach to mobile wireless communication network, much as discussed above with respect to 405, by requesting to attach via eNodeB 115a. However, it is noted that at this point in time, the suspension recorded at 445 remains in effect. At 465, the attach request is forwarded to MME 120. At 470, MME 120 attempts to authorize mobile station 110a via HSS 135. At 475, HSS 135 determines that the subscription for mobile station 110a is inactive or suspended, based on the information recorded at 445. As a result, at 480, HSS 135 indicates to MME 120 that the attempt to authorize mobile station 110a has failed. As a result, at 485, MME 120 rejects the request to attach at 465, and at 490, eNodeB 115a rejects the request to attach at 460. Thus, mobile station 110a is unable to make use of mobile wireless communication network 105 as a result of the number of SLAVs detected at 435. Much as described with respect to 280 and 285 in FIG. 2, the subscription for mobile station 110a may be reactivated by account owner 180 contacting an operator of mobile wireless communication network 105.

Figure 5:
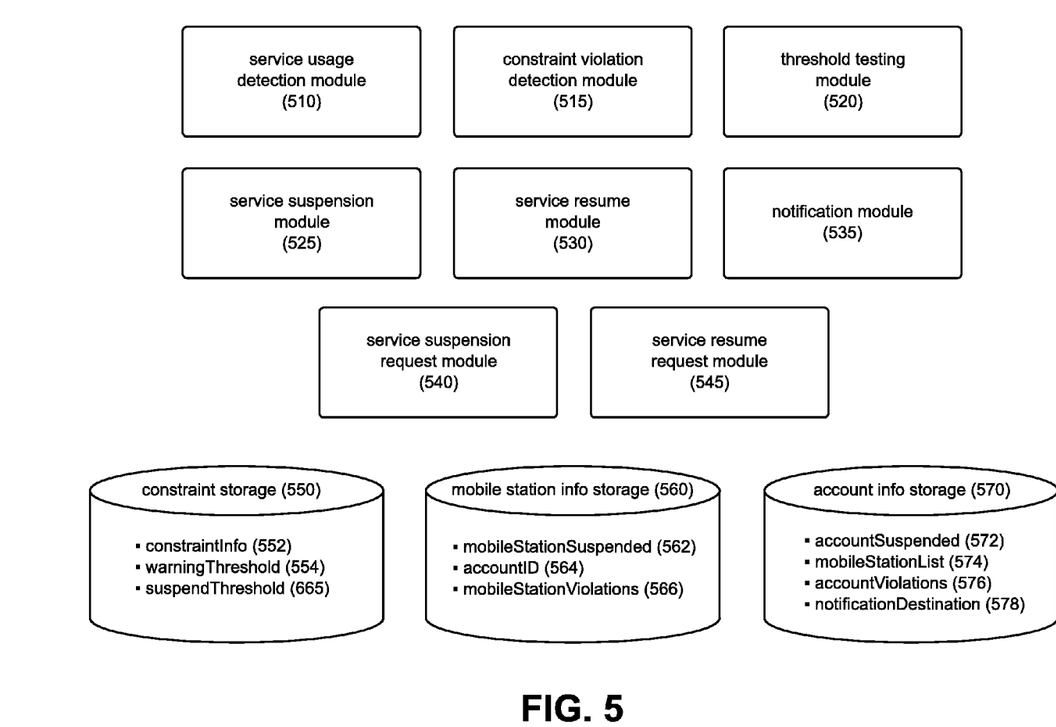
FIG. 5 illustrates various code and data storage components that may be utilized to implement the process illustrated in FIG. 2.

FIG. 5 illustrates various code and data storage components that may be utilized to implement the process illustrated in FIG. 2. Modules 510-545 may each be implemented by, for example, executable instructions and accompanying data included in a nontransitory computer readable medium. Storage 550, 560, and 570 may be implemented by, for example, database computer programs and/or storage such as main memory 606 and/or storage device 610 described with respect to FIG. 6. Modules 510-545 and storage 550, 560, and 570 may be collected in or divided among various elements of mobile wireless communication network 105 illustrated in FIG. 1.

Service usage detection module 510 may include instructions which cause one or more processors to perform the procedures discussed with respect to 210 in FIG. 2. Constraint violation detection module 515 may include instructions which cause one or more processors to perform the procedures discussed with respect to 215 and 220 in FIG. 2. Threshold testing module 520 may include instructions which cause one or more processors to perform the procedures discussed with respect to 230, 235, 240, 245, and 250 in FIG. 2. Service suspension module 525 may include instructions which cause one or more processors to perform the procedures relating to responding to a request to suspend of one or more mobile stations discussed with respect to 270 and/or 275 in FIG. 2. Service resume module 530 may include instructions which cause one or more processors to perform the procedures relating to responding to a request to remove a suspension of one of more mobile stations discussed with respect to 285 in FIG. 2. In some examples, HSS 135 may include service suspension module 525 and/or service resume module 530. Notification module 535 may include instructions which cause one or more processors to perform the procedures discussed with respect to 255a, 255b, 260, and/or 265 in FIG. 2. Service suspension request module 540 may include instructions which cause one or more processors to perform the procedures discussed with respect to 270 and/or 275 in FIG. 2. Service resume request module 545 may include instructions which cause one or more processors to perform the procedures relating to requesting removal of a suspension discussed with respect to 285 in FIG. 2. In some examples, CS server 150 may include service resume request module 545.

Constraint storage 550 provides storage which may be used for storing information about constraints describing limitations of use of services under various SLAs. Constraint storage 550 may be used by, for example, constraint violation detection module 515. For each constraint stored in constraint storage 550, constraint storage 550 may store, for example, a value constraintInfo 552, which describes a limitation for use of a service, a value warningThreshold 554, which stores a value for the warning threshold described above, and a value suspendThreshold 556, which stores a value for the suspend threshold described above.

Mobile station info storage 560 provides storage which may be used by for storing information relating to individual mobile stations, such as mobile station 110a. Mobile station info storage 560 may be used by, for example, threshold testing module 520, service suspension module 525, and/or service resume module 530. For each mobile station, mobile station info storage 560 may store, for example, a value mobileStationSuspended 552 indicating whether a subscription for the mobile station is suspended due to SLAVs, a value accountID 554 identifying an account under which the mobile station is subscribed to mobile wireless communication network 105, and mobileStationViolations 556 recording a number of, and potentially details of, SLAVs by the mobile station.

Account info storage 570 provides storage which may be used for storing information relating to accounts under which mobile stations are subscribed to mobile wireless communication network 105. Account info storage 570 may be used by, for example, threshold testing module 520, service suspension module 525, service resume module 530, and notification module 535. For each account, account info storage 570 may store, for example, a value accountSuspended 562 indicating whether the account is suspended due to SLAVs, mobileStationList 564 listing which mobile stations are subscribed under the account, accountViolations 566 recording a number of, and potentially details of, SLAVs by mobile station subscribed under the account, and notificationDestination 568 which describes a notification destination, such as an email address or SMS text message number, associated with the account.

Figure 6:
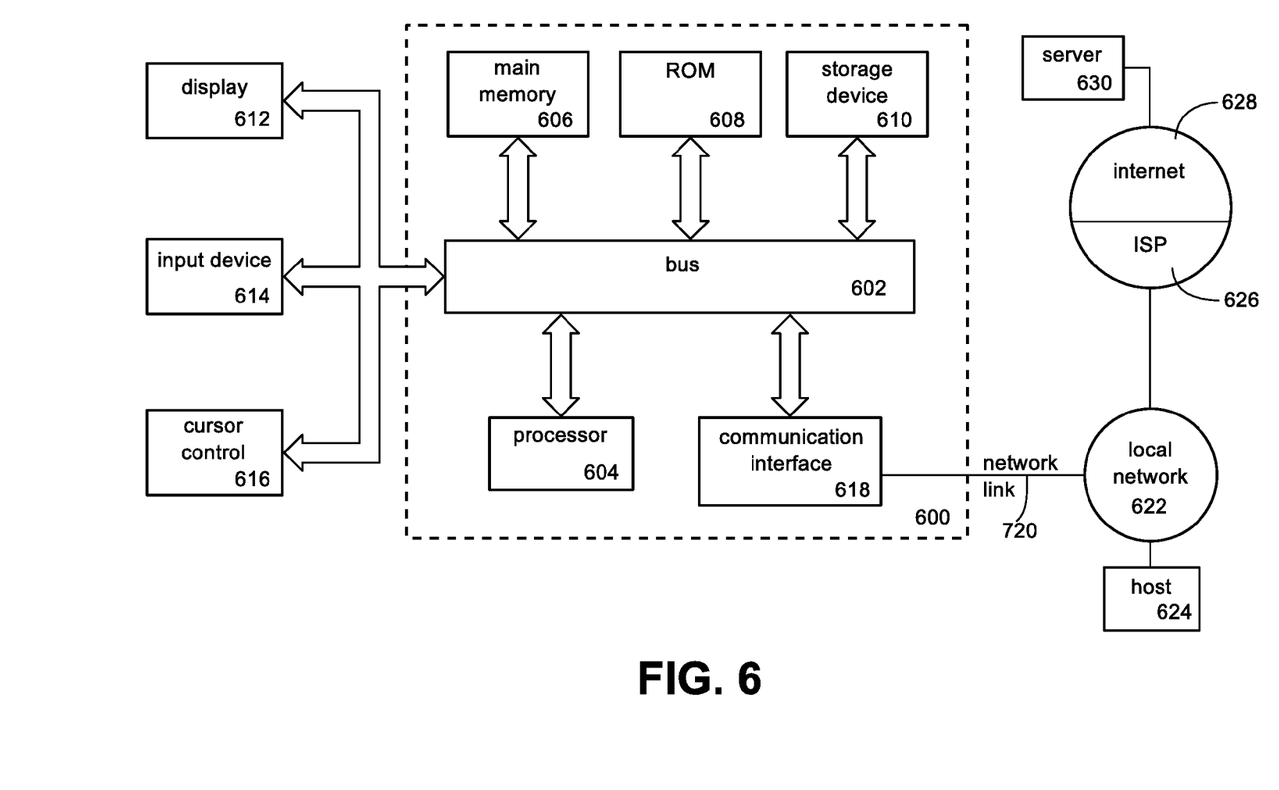
FIG. 6 is a block diagram that illustrates a computer system 600 upon which aspects of this disclosure may be implemented.

FIG. 6 is a block diagram that illustrates a computer system 600 upon which aspects of this disclosure may be implemented, such as, but not limited to mobile stations 110a, 110b, and 110c, eNodeBs 115a and 115b, MME 120, SGW 125, PGW 130, HSS 135, CSCF 140, AS 145a, AS 145b, CS server 150, SLAV system 155, web server 160, email servers 165 and 175, mobile device 185, and PC 190. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT) or liquid crystal display (LCD), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Another type of user input device is a touchscreen, which generally combines display 612 with hardware that registers touches upon display 612.

This disclosure is related to the use of computer systems such as computer system 600 for implementing the techniques described herein. In some examples, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In some examples, hardwired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. In some examples implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A computer-implemented method comprising:
   receiving a first service request from a mobile station for a service to be provided by a mobile wireless communication network, wherein the mobile station is subscribed to the mobile wireless communication network under an account;
   obtaining, based on an identifier for the mobile station, a constraint describing a limitation on use of the service;
   determining that the first service request for the service to be provided by the mobile wireless communication network violates the constraint by falling outside the limitation on use of the service;
   obtaining a first number of previous service requests that have violated the constraint;
   determining a first total number of service requests violating the constraint based on the first number of previous requests violating the constraint and whether the first service request violates the constraint;
   obtaining, based on the identifier for the mobile station, a first threshold number of violations;
   determining, in response to the determination that the first service request violates the constraint, that the first total number of service requests violating the constraint issued by the mobile device or issued by mobile devices subscribed to the mobile wireless communication network under the account is equal to or greater than the first threshold number, wherein the first total number of service requests includes the first service request;
   identifying a notification destination for the account; and
   automatically transmitting, in response to the determination that the first total number is equal to or greater than the first threshold number, a first notification to the notification destination.

2. The computer-implemented method of claim 1, further comprising:
   suspending a subscription for the mobile station on the mobile wireless communication network in response to the determination that the first total number is equal to or greater than the first threshold number;
   wherein the first notification indicates that the subscription for the mobile station is suspended.

3. The computer-implemented method of claim 2, wherein the suspending the subscription includes:
   transmitting a message to a home subscriber server (HSS) system included in the mobile wireless communication network; and
   recording within the HSS, in response to the message, that the subscription for the mobile station is suspended.

4. The computer-implemented method of claim 3, wherein the message is transmitted to the HSS system via an S6a, S6b, Cx, or Sh Diameter interface.

5. The computer-implemented method of claim 3, wherein the message is one of:
   a Purge-UE-Request message transmitted via an S6a Diameter interface;
   a Session-Termination-Request message transmitted via an S6b Diameter interface;
   a Server-Assignment-Request message with an indication of administrative deregulation transmitted via a Cx Diameter interface; or
   a Profile-Update-Request message transmitted via an Sh Diameter interface.

6. The computer-implemented method of claim 2, further comprising:
   receiving a second service request from the mobile station;
   determining that the second service request violates the constraint by falling outside the limitation on use of the service;
   obtaining a second number of previous service requests that have violated the constraint;
   determining a second total number of service requests violating the constraint based on the second number of previous requests violating the constraint and whether the second service request violates the constraint;
   obtaining, based on the identifier for the mobile station, a second threshold number of violations, wherein the second threshold number is less than the first threshold number;
   determining, in response to the determination that the second service request violates the constraint, that a second total number of service requests violating the constraint issued by the mobile device or issued by the mobile devices subscribed to the mobile wireless communication network is equal to or greater than the second threshold number, wherein the second total number of service requests includes the second service request; and
   automatically transmitting, in response to the determination that the second total number is equal to or greater than the second threshold number, a second notification to the notification destination, wherein the second notification includes a warning that the mobile device violated the constraint.

7. The computer-implemented method of claim 2, wherein the service for the mobile station remains suspended until an owner of the account contacts an operator of the mobile wireless communication network.

8. The computer-implemented method of claim 1, wherein a plurality of mobile stations, which includes the first mobile station, are subscribed to the mobile wireless communication network under the account.

9. The computer-implemented method of claim 1, wherein the notification destination does not specify a mobile station subscribed with the mobile wireless communication network under the account.

10. The computer-implemented method of claim 1, wherein the constraint indicates at least one of:
    a maximum number of times the service may be requested within a duration of time;
    a maximum amount of data to be transferred within a duration of time; or
    a minimum amount of time between subsequent service requests.

11. The computer-implemented method of claim 1, wherein the determining that the first service request violates the constraint is performed by an MME (Mobility Management Entity), PGW (Public Data Network Gateway), CSCF (Call Session Control Function), or AS (Application Server) included in the mobile wireless communication network.

12. A system comprising:
one or more computer processors included in a mobile wireless communication network; and
one or more nontransitory computer readable media, including instructions thereon which cause the one or more computer processors to:
receive a first service request from a mobile station for a service to be provided by the mobile wireless communication network, wherein the mobile station is subscribed to the mobile wireless communication network under an account;
obtain, based on an identifier for the mobile station, a constraint describing a limitation on use of the service;
determine that the first service request for the service to be provided by the mobile wireless communication network violates the constraint by falling outside the limitation on use of the service;
obtain a number of previous service requests that have violated the constraint;
determine a first total number of service requests violating the constraint based on the number of previous requests violating the constraint and whether the first service request violates the constraint;
obtain, based on the identifier for the mobile station, a first threshold number of violations;
determine, in response to the determination that the first service request violates the constraint, that the first total number of service requests violating the constraint issued by the mobile device or issued by mobile devices subscribed to the mobile wireless communication network under the account is equal to or greater than the first threshold number, wherein the first total number of service requests includes the first service request;
identify a notification destination for the account; and
automatically transmit, in response to the determination that the first total number is equal to or greater than the first threshold number, a first notification to the notification destination.

13. The system of claim 12, wherein
the instructions further cause the one or more processors to suspend a subscription for the mobile station on the mobile wireless communication network in response to the determination that the first total number is equal to or greater than the first threshold number; and
the first notification indicates that the subscription for the mobile station is suspended.

14. The system of claim 13, wherein to suspend the subscription, the instructions cause the one or more processors to:
transmit a message to a home subscriber server (HSS) system included in the mobile wireless communication network; and
recording within the HSS, in response to the message, that the subscription for the mobile station is suspended.

15. The system of claim 14, wherein the message is transmitted to the HSS system via an S6a, S6b, Cx, or Sh Diameter interface.

16. The system of claim 14, wherein the message is one of:
a Purge-UE-Request message transmitted via an S6a Diameter interface;
a Session-Termination-Request message transmitted via an S6b Diameter interface;
a Server-Assignment-Request message with an indication of administrative deregulation transmitted via a Cx Diameter interface; or
a Profile-Update-Request message transmitted via an Sh Diameter interface.

17. The system of claim 13, wherein the instructions further cause the one or more processors to:
receive a second service request from the mobile station;
determine that the second service request violates the constraint by falling outside the limitation on use of the service;
obtain a second number of previous service requests that have violated the constraint;
determine a second total number of service requests violating the constraint based on the second number of previous requests violating the constraint and whether the second service request violates the constraint;
obtain, based on the identifier for the mobile station, a second threshold number of violations, wherein the second threshold number is less than the first threshold number;
determine, in response to the determination that the second service request violates the constraint, that a second total number of service requests violating the constraint issued by the mobile device or issued by the mobile devices subscribed to the mobile wireless communication network is equal to or greater than the second threshold number, wherein the second total number of service requests includes the second service request; and
automatically transmit, in response to the determination that the second total number is equal to or greater than the second threshold number, a second notification to the notification destination, wherein the second notification includes a warning that the mobile device violated the constraint.

18. The system of claim 12, wherein a plurality of mobile stations, which includes the first mobile station, are subscribed to the mobile wireless communication network under the account.

19. The system of claim 12, wherein the notification destination does not specify a mobile station subscribed with the mobile wireless communication network under the account.

20. The system of claim 12, wherein the constraint indicates at least one of:
a maximum number of times the service may be requested within a duration of time;
a maximum amount of data to be transferred within a duration of time; or
a minimum amount of time between subsequent service requests.